(No Model.) 2 Sheets—Sheet 1.

J. M. ROACH.
SAFETY COUPLING FOR CARS.

No. 490,399. Patented Jan. 24, 1893.

Witnesses.
Inventor.
John M Roach
Wm Johnson
By
Atty.

(No Model.) 2 Sheets—Sheet 2.

J. M. ROACH.
SAFETY COUPLING FOR CARS.

No. 490,399. Patented Jan. 24, 1893.

Witnesses.
Wm. M. Rheem
Wm. F. Henning

Inventor.
John M. Roach
By Wm. Johnson
Atty.

UNITED STATES PATENT OFFICE.

JOHN M. ROACH, OF CHICAGO, ILLINOIS.

SAFETY-COUPLING FOR CARS.

SPECIFICATION forming part of Letters Patent No. 490,399, dated January 24, 1893.

Application filed October 20, 1892. Serial No. 449,707. (No model.)

*To all whom it may concern:*

Be it known that I, JOHN M. ROACH, a citizen of the United States, residing at Chicago, in the county of Cook and State of Illinois, have invented certain new and useful Improvements in Safety-Connections for Railroad-Cars; and I do hereby declare the following to be a full, clear, and exact description of the invention, such as will enable others skilled in the art to which it appertains to make and use the same.

My invention relates to improvements in safety appliances which are adapted to maintain connection between railroad cars when from any cause the couplings or draw-bars become disconnected or are broken.

Figure 1:
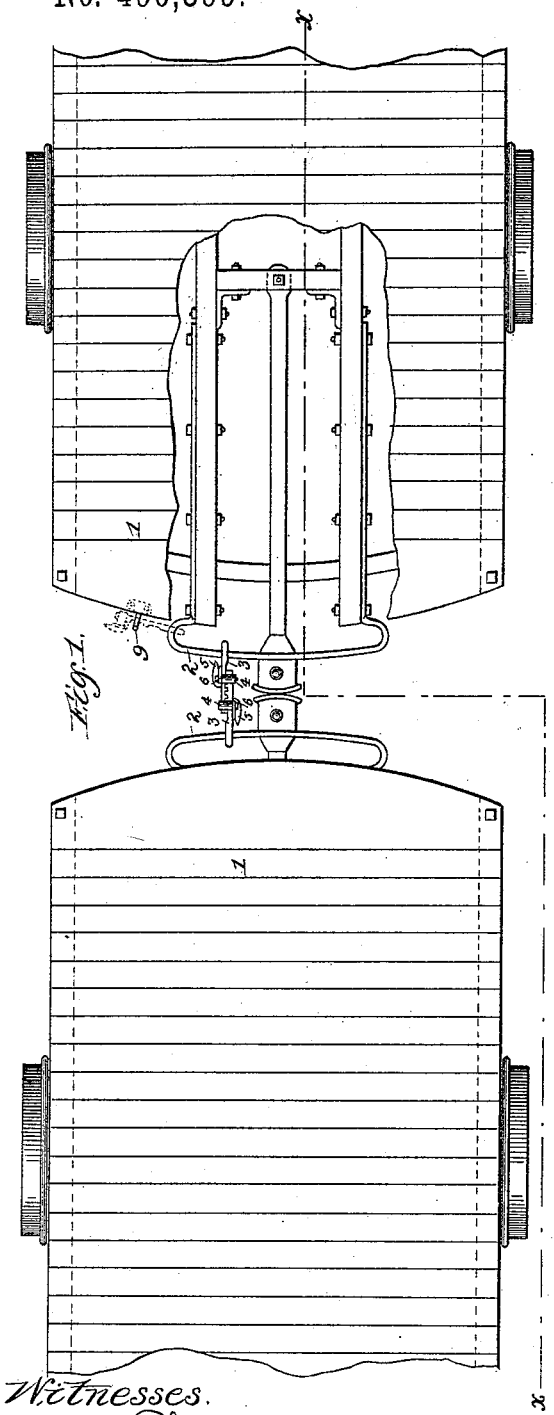
Figure 2:
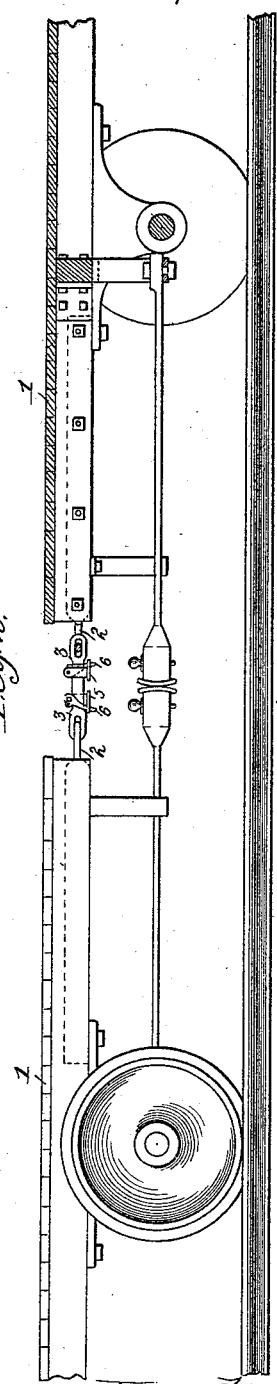
Figure 3:
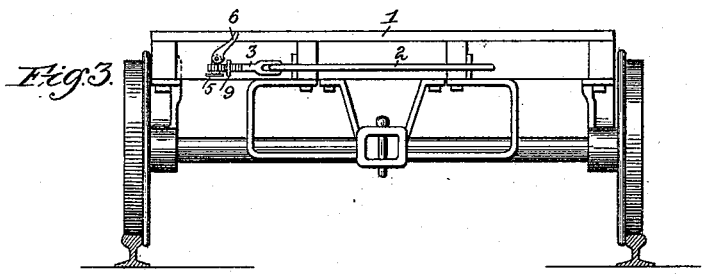
Figure 4:
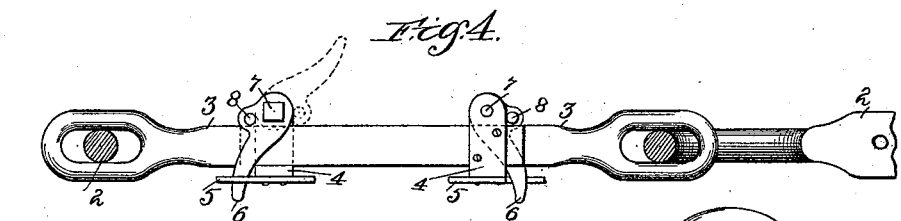
Figure 5:
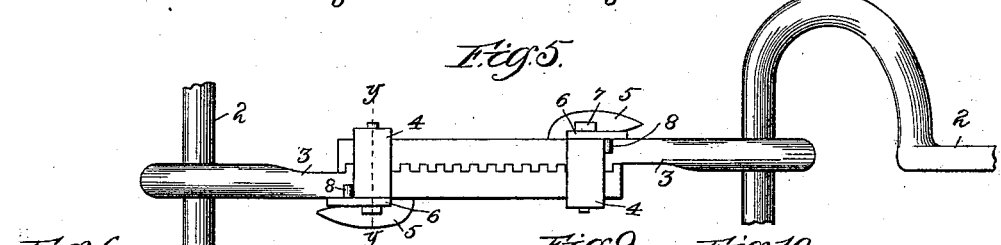
Figures 6, 8, 9, 10:
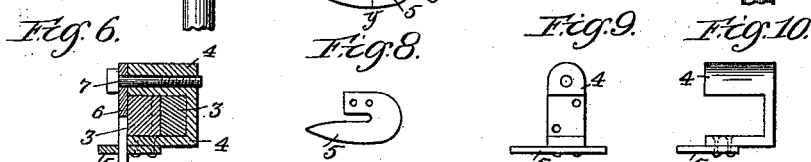
Figure 7:
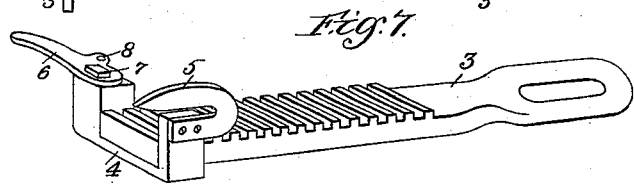
Figure 11:
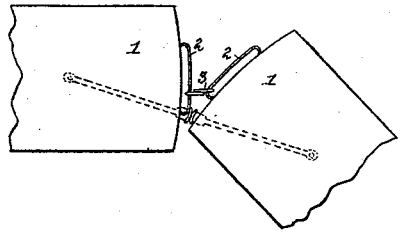

The object of my invention is to provide a safety connection or appliance that shall be instantly operative and that does not require an undue amount of slack for the passage of a curve, as is the case with the ordinary safety chain attachment, and that may be conveniently located with reference to the movement of the couplings and draw-bars. I attain these objects by the means set forth in the following specifications and claims, reference being had to the accompanying drawings, in which Figure 1 is a plan view of the meeting or coupled ends of two cars, a portion of the flooring of one of which is cut away for the purpose of showing the attachment of the safety slide bar to the timber or frame work of the body of the car. Fig. 2 is a longitudinal section taken on the line *x. x.* of Fig. 1. Fig. 3 is an end view of the car and safety appliance when the cars are disconnected. Fig. 4 is a detached side view of a pair of the safety links or eye bars when locked together, and portions of the slide bar. Fig. 5 is a top view of the same. Fig. 6 is a transverse section of the connecting link or eye bar on the line *y. y.* of Fig. 5. Fig. 7 is a perspective view of the safety link or eye-bar. Figs. 8, 9 and 10 are detail views of the clamping strap, lever and hook plate attached to the connecting eye-bar, and which are readily understood. Fig. 11 is a diagram plan view showing the position of the cars and safety connection upon a short curve.

Referring to the drawings, 1 designates the body of the car, and which as here shown is of the ordinary street car type.

2 is the safety slide bar, which is approximately U-shaped, the sides being formed of flat bar-iron and connected by a round bar formed integral with the sides; the flat or strap portions of said slide bar extend back under the floor of the car and are bolted solidly to the longitudinal string pieces which support the floor, and the round transverse portion of said bar projects outward in front of the body of the car parallel with, or more preferably curved concentric with the end of the car, as shown in the drawings.

3 are the connecting safety links or eye-bars, which have elongated or enlarged eyes or loops formed at one end, through which the round portion of bar 2 is inserted, and upon which the said connecting eye-bar is adapted to slide horizontally and to turn vertically; the body of said safety link or eye-bar for a portion of its length is provided with rectangular tooth projections and spaces which are cut or formed transversely upon one of its sides or faces, and which are adapted to fit into like tooth projections and spaces of a like interchangeable bar, the said tooth projections are for the purpose of adjusting the eye-bars to the length required by the distance the cars are apart when coupled, and to bea the pulling strain, should it be thrown upon them; the said connecting links or eye-bars have clamp bands, 4, solidly attached to their outer or toothed ends; said bands are open upon one side to admit the insertion of a like or mating bar, the two bars being held in line edgewise thereby. A hook plate 5 is solidly attached to or may be formed integral with the bottom end of said clamp band, the hook part of which stands or projects out beyond the back of the duplicate or mating bar, and clamping levers 6 are attached to the top or upper end of said clamp bands by means of the screws, 7, upon which the said clamping levers are adapted to be turned between the projecting hooks and back of the mating bars, and to grip the two bars firmly together, in which position they are equal in tensile strength to a continuous solid bar with greater lateral stiffness.

In taking the eye-bars apart the clamping levers are turned to the position represented by the dotted lines shown in Fig. 4, a stop pin, 8, being inserted in the clamping lever to retain it in that position. A hook bolt, 9, is attached to the under side of the platform of the car to suspend and hold the safety eye-bar when not in use, as is shown by dotted lines in Fig. 1.

The couplings and draw-bars and their connections to the cars are of the kind in ordinary use upon street cars, to which my invention has greater special adaptation, and need no further description.

In carrying out my invention it will be observed that I place the transverse slide bar well up to the top of the platform of the car, so that the connecting bar is out of the way of the couplings and draw-bars, the lateral or horizontal movement of which extends nearly across the ends of the cars when upon a short curve, and which makes the ordinary safety chain attachment impracticable, as a greater length of chain is required for a curve than straight track, and which makes it necessary—as is now done in some cases—either to disconnect the chain before passing a sharp curve or to have the length so great that the slack will drag upon the ground and will get in the way of and become tangled with the couplings and draw-bars. Moreover, the longer the chain the greater its liability to be broken, should an accident occur upon a steep grade, and with enormously overloaded trains of cars, now daily frequent in our large cities. It will also be seen that I extend the safety slide bar well out in front of the car, so that the safety connection between the cars may be as short as possible within practical limits, and also that the length of the slide bar is sufficient for the greatest traverse of the connecting link or bar thereon, and further, that the strap or side portions of the bar are adapted to give additional strength and support to the longitudinal stringers and platforms of the cars, and which is often found to be necessary.

From the foregoing description it will be seen that the construction and arrangement forms a desirable safety appliance, and that it is, as in practical use it has proved to be, well adapted for the purpose intended.

I have herein described but one form of safety connecting link or bar, but it is evident that short chains with rings and hooks, and that various other modified forms of bars might be used and substituted therefor without departing from the spirit of my invention. I do not, therefore, desire to limit myself to the precise form or construction or proportion of the parts as herein shown.

Having described my invention, I claim,—

1. In a railroad car the combination with the body of the car, 1, of the approximately U-shaped bar, 2, the transverse portion of which is adapted as a slide and support for a safety connecting link or eye-bar to slide and turn upon, and the sides of which are adapted to be bolted to the longitudinal string pieces of the body of the car and to give additional strength and support thereto, as and for the purpose specified.

2. In a railroad car the combination with the body of the car, 1, of a transverse bar, 2, solidly attached to the ends of the body and adapted for a slide and support for a safety connection link or eye-bar, and the safety link or eye-bar, 3, one end of which is adapted to slide and turn upon said transverse slide bar, 2, and the body of which is provided with rectangular tooth projections cut or formed upon one side of the said body perpendicular to the edge or center line thereof, said tooth projections adapted to fit into spaces formed by like tooth projections of a like mating bar and to interlock therewith, and means adapted for securing a pair of said eye-bars firmly interlocked together, and to practically form a continuous solid bar connection between the cars, as and for the purpose specified.

3. In a railroad car the combination with the body of the car of a safety connecting link or eye-bar adapted to slide horizontally across the ends of said body, said connecting safety link or eye-bar provided with tooth projections adapted to interlock with the tooth projections of a like mating bar, and means adapted to securely grip a pair of said bars together when interlocked, to form a continuous safety connection between the cars, as and for the purpose specified.

4. The combination with the body of a railroad car of a link or eye-bar attached to the ends of the body of the car, the said link or eye-bar provided with tooth projections which fit into spaces formed by like tooth projections of a like interchangeable or mating bar, the said tooth projections adapted for the adjustment of a pair of said bars to the length as may be required by the distance between the cars when coupled together, and to resist and sustain the tensile or pulling strain when thrown upon the interlocked bars, and means adapted to grip and hold the bars firmly together, as and for the purpose specified.

5. In a railroad car the combination comprising the body of the car, 1, the transverse slide bar, 2, solidly attached to the ends of the car, the safety links or eye-bars, 3, adapted to slide horizontally and turn vertically upon the said transverse slide bar, the said eye-bars provided with rectangular tooth projections cut or formed across one of their sides or faces, the clamp bands, 4, solidly attached to the ends of said eye-bars, the hook plates, 5, solidly attached to or formed integral with the bottom side of said bands, the clamping levers, 6, attached to the top part or end of said bands by means of the screws, 7, and adapted to be turned thereon between the hook at the bottom of the strap and the back of the mating bar, to grip or clamp the bars firmly together, substantially as and for the purpose specified.

In testimony whereof I affix my signature in presence of two witnesses.

JOHN M. ROACH.

Witnesses:
EUGENE W. SHERMAN,
SARAH B. HALL.